United States Patent
Darby

(10) Patent No.: US 12,313,148 B2
(45) Date of Patent: May 27, 2025

(54) ATTACHMENT FOR ROTARY ACTUATOR TO WING

(71) Applicant: Goodrich Actuation Systems Limited, Solihull (GB)

(72) Inventor: Jonathan Darby, Newcastle under Lyme (GB)

(73) Assignee: GOODRICH ACTUATION SYSTEMS LIMITED, Solihull (GB)

(*) Notice: Subject to any disclaimer, the term of this patent is extended or adjusted under 35 U.S.C. 154(b) by 23 days.

(21) Appl. No.: 17/979,881

(22) Filed: Nov. 3, 2022

(65) Prior Publication Data
US 2023/0133770 A1 May 4, 2023

(30) Foreign Application Priority Data
Nov. 4, 2021 (EP) .................................... 21275156

(51) Int. Cl.
*B64C 13/28* (2006.01)
*F16H 19/08* (2006.01)

(52) U.S. Cl.
CPC ............. *F16H 19/08* (2013.01); *B64C 13/28* (2013.01)

(58) Field of Classification Search
CPC .......... F16H 19/08; B64C 13/28; B64C 3/56; B64C 9/02; B64C 23/06
See application file for complete search history.

(56) References Cited

U.S. PATENT DOCUMENTS

| | | |
|---|---|---|
| 6,260,799 B1 | 7/2001 | Russ |
| 9,868,511 B2 | 1/2018 | Henning et al. |
| 10,759,522 B2 | 9/2020 | Axford et al. |
| 10,981,643 B2 | 4/2021 | Cross |
| 10,994,827 B2 | 5/2021 | Winkelmann et al. |

(Continued)

FOREIGN PATENT DOCUMENTS

| | | |
|---|---|---|
| CN | 109606633 A | 4/2019 |
| EP | 3015363 A1 | 5/2016 |

(Continued)

OTHER PUBLICATIONS

Abstract for CN109606633 (A), Published: Apr. 12, 2019, 1 page.
European Search Report for Application No. 21275156.4, mailed Apr. 12, 2022, 7 pages.

*Primary Examiner* — Tye William Abell
(74) *Attorney, Agent, or Firm* — CANTOR COLBURN LLP

(57) ABSTRACT

A rotary actuator mounting system configured to attach a rotary actuator to and between two relatively moveable parts, the rotary actuator being attached to a first of the two relatively moveable parts and to a second of the relatively moveable parts such that operation of the actuator causes one of the first and second relatively movable parts to rotate relative to the other of the first and second relatively movable parts about an axis of the rotary actuator. The system includes a compliant attachment component connecting the actuator to the first relatively moveable part, the compliant attachment component having a first end attached to the first movable part and a second end attached to the actuator, and wherein at least one of the first and the second end is in the form of a ball bearing arranged to be received in a complementary socket on the actuator and/or the first movable part.

9 Claims, 2 Drawing Sheets

(56) References Cited

U.S. PATENT DOCUMENTS

| | | |
|---|---|---|
| 11,066,148 B2 | 7/2021 | Elenbaas et al. |
| 2016/0229524 A1* | 8/2016 | Huynh .................... B64C 9/00 |
| 2020/0361596 A1* | 11/2020 | Lorenz .................... B64C 3/56 |

FOREIGN PATENT DOCUMENTS

| | | | |
|---|---|---|---|
| WO | 2019034432 | A1 | 2/2019 |
| WO | 2020239606 | A1 | 12/2020 |

\* cited by examiner

ATTACHMENT FOR ROTARY ACTUATOR TO WING

CROSS-REFERENCE TO RELATED APPLICATIONS

This application claims priority to European Patent Application No. 21275156.4 filed Nov. 4, 2021, the entire contents of which is incorporated herein by reference.

TECHNICAL FIELD

The present disclosure is concerned with means for mounting or attaching a rotary actuator to a wing assembly of an aircraft.

BACKGROUND

Modern aircraft include a number of movable surface or panels such as flight control surface of wing tips that are configured to be movable relative to another part of the aircraft e.g. to another, fixed or stationary part of a wing. The movable parts are typically moved relative to the stationary part by means of an actuator. Various types of actuator are known including hydraulic, mechanical and electrical actuators. In applications where it is important to minimise weight and size of parts on an aircraft, rotary actuators are used comprising a fixed stator part and a movable rotor part. Rotary geared actuators (RGAs) have been developed in which the input and the output are linked by a series of gears to step down high speed rotation of hydraulic or electric drive motors to provide slower speed accurate positioning of a movable part. These actuators are typically positioned along the hinge line between a stationary part and a relatively rotatable part. The rotary actuator has so called earth members for fixing the actuator to one of the parts and output members for attachment to the other part. Typically, the earth members are attached to the stationary part of the wing and are mounted to bolts and flanges or by means of trunnion mounts. The output members are then attached to the movable part also by known attachment means such as bolts or the like. RGAs are now commonly used in controlling moveable flight control surfaces such as flaps and slats provided on an aircraft wing.

Some aircraft are designed to have wings with folding portions e.g. folding tips. Generally, larger aircraft, with larger wing spans, that can carry more passengers are more fuel efficient. Further, aerodynamic drag is generally reduced the longer the aircraft wings are, and, so, the more efficient the aircraft is in flight. Long wing spans, however, can present problems on the ground, for example where airport space e.g. at the gate or on the taxiway, is limited. Foldable wing systems have therefore been developed. The wings can be extended to their full span for flight, but the wing tips can be folded up (or down) relative to the fixed portion of the wing when space is limited. The wing parts are usually assembled such that spaced apart lugs along the edge of the foldable wing part that meets the fixed wing part fit between spaced apart lugs along the matching edge of the fixed wing part. The interlocking lugs together define a hinge passage through which a locking pin is pushed by an actuator when the wings parts are to be locked in the extended position. The wing tip is pivoted relative to the main part of the wing by means of an actuator in much the same way as described above for other relatively movable parts. Different types of actuator may be used e.g. hydraulic, electromechanical or electrical actuators are used in aircraft to control moveable parts.

Where a rotary actuator is used, it will, as mentioned above, be mounted to one of the relatively movable wing parts—typically the stationary wing part as this is usually bigger and more robust that the relatively moveable part. Further, as the movable part requires energy to move, it should be kept as small and light as possible.

During flight, however, particularly for large aircraft, high loads act on the wing structure and can cause the wing to bend due the air and wind forces and operational loads. There is a current desire for aircraft wings to be relatively thin, and the loads and wind bending are more significant for thinner wings. During flight, then, these loads and bending will be transferred to the actuator attached between the two relatively movable wing parts. In the case of a foldable wing tip, the tip is a relatively thin part of the overall wing structure and, during flight, is opened out relative to the main wing body by means of the actuator mounted between the two parts. This tip part will experience a high degree of deflection during operation. There is, therefore, a high relative deflection between the fixed wing part on which the actuator is mounted and the actuator itself. It is not feasible to reinforce the wing structure to address this problem as this would undesirably add to the size and weight of the structure.

Further, aircraft operate over a very wide range of temperatures and the wing materials and the materials of the actuator will have different thermal expansion coefficients over the large operating temperature range. This can cause problems when relative material thermal expansion movement occurs between the wing structure and the earth members of the actuator attached to the wing.

Such movement due to deflections or different thermal expansion can adversely affect the operation of the actuator because, particularly in the case of a geared actuator, the gear trains are very precisely machined and are not tolerant to changes in loading. Such movements can also cause structural damage to the actuator.

There is a need for a way of securely attaching a rotary actuator to a wing structure that avoids the above-mentioned problems.

SUMMARY

According to the disclosure, there is provided a rotary actuator mounting system configured to attach a rotary actuator to and between two relatively moveable parts, the rotary actuator being attached to a first of the two relatively moveable parts and to a second of the relatively moveable parts such that operation of the actuator causes one of the first and second relatively movable parts to rotate relative to the other of the first and second relatively movable parts about an axis of the rotary actuator, the system further comprising a compliant attachment component connecting the actuator to the first relatively moveable part, the compliant attachment component having a first end attached to the actuator and a second end attached to the first movable part, and wherein at least one of the first and the second end is in the form of a ball bearing arranged to be received in a complementary socket on the actuator and/or the first movable part.

BRIEF DESCRIPTION

Examples according to the disclosure will now be described in more detail with reference to the drawings. These are examples only, and variations are possible within the scope of the claims.

Whilst the attachment according to the disclosure will be described for mounting a rotary geared actuator to an aircraft wing with a foldable tip, for moving the wing tip relative to the main body of the wing, this is but one example of where the attachment of the disclosure can be used. The attachment can be used to mount other types of actuators and also between other pairs of relatively moveable surfaces.

DETAILED DESCRIPTION

Figure 1:
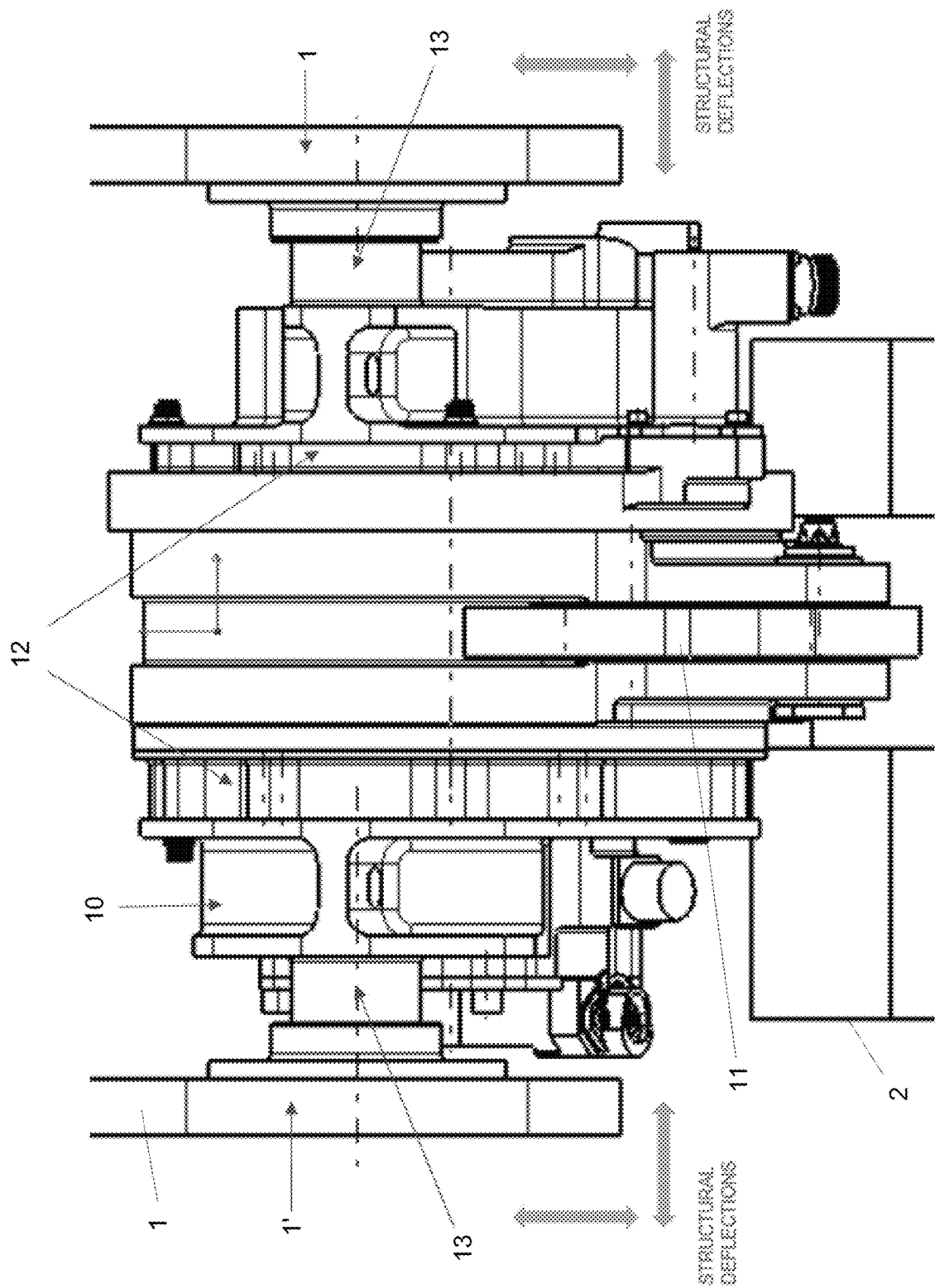
FIG. 1 is a planar view of a geared rotary actuator mounted to a wing structure using conventional attachment.

FIG. 1 shows a rotary actuator 10 positioned between and attached to two relatively moveable wing parts 1,2. The actuator is located on the first part 1 which, in this example, is the main body of the aircraft wing. The actuator can be any known type of rotary actuator having a stator part and a rotor part. Input rotation is provided to the actuator (not shown) by a drive means such as a motor. This causes rotation of the gears of the actuator which result in rotation of the rotor 11. The rotor 11 is fixed to the second relatively movable part which may be, e.g. a foldable wing tip. The actuator operation is known in the art and will not be described in any detail. The drawing is schematic only. Different types of rotary actuator are possible. With a geared actuator, as shown, the gears of the actuator operate such that the output rotor 11 rotates in response to, but at a different speed to the input rotation to cause relative rotation of the other part 2, to which the output rotor 11 is attached.

In a conventional arrangement, the actuator is mounted to the first relatively moveable part 1 via earth members 12 on the actuator. The earth members around the body of the actuator are secured to the wing part 1 in any known way by a fixed fastener such as a bolt or trunnion mount 13 attached to the earth member by an external housing (not shown). A trunnion mount provides rotational and axial degrees of freedom but does not allow for any twisting of the structural parts relative to the actuator assembly.

As mentioned above, deflections (shown by the arrows in FIG. 1) in the wing parts 1,2 due to e.g. wind bending and/or unequal thermal expansion will be transferred to the attached actuator causing damage and/or affecting its operation.

Figure 2:
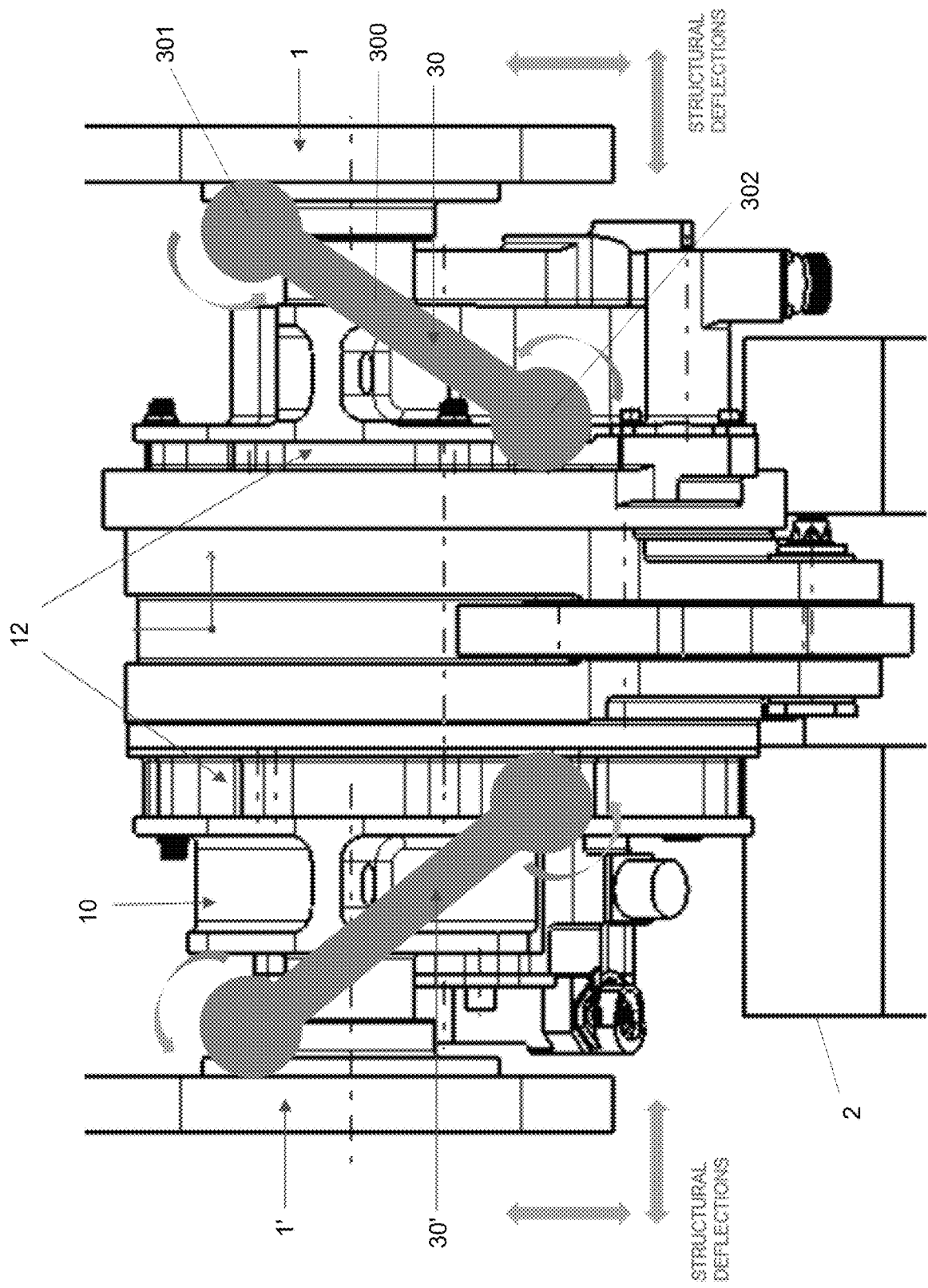
FIG. 2 is a planar view of a geared rotary actuator mounted to a wing structure using an attachment according to the disclosure.

In the attachment design according to the disclosure, an example of which is shown in FIG. 2, the fixed mounting to the wing parts is replaced by a compliant attachment 30 between the actuator 10 and the first relatively movable part 1. The same reference numerals are used as FIG. 1 for the same parts. The compliant attachment 30 comprises an elongate body portion 300, a first end 301 and a second end 302.

The first end 301 is arranged to attach to the first relatively movable part 1 and the second end 302 is arranged to attach to the actuator e.g. at the earth member 12. The compliant attachment 30 is designed to accommodate relative movement between the wing part and the actuator whilst retaining a secure attachment between the two.

At least one of the two ends 301,302 is in the form of a ball or spherical bearing that can be rotatably received in a complementary socket (not shown) provided on the wing/actuator part to which that end is attached. In the example shown, both ends 301 and 302 are formed as spherical bearings able to form a rotatable attachment to both the wing part and the actuator to allow some relative movement between the attachment and the parts, thus allowing there to be some relative movement between the wing part and the actuator. In this way, deflections of the wing or expansion movement will not be directly transferred to the actuator as they will be taken up by movement of the attachment. It is also feasible that only one of the ends is formed as a ball bearing. The other end could be attached to the wing/actuator in the conventional manner.

The attachment, therefore, allows the actuator to be securely mounted to the wing structure but isolates the actuator from wing bending forces and thermal expansion movement.

Any number of compliant attachments may be provided to attach the earth members 12 to the wing structure 1. The attachment can be attached directly to the earth members 12 without the need for external housings. In the example shown, two compliant attachments are provided—a first 30, attached to a first side 1 of the wing and a second, 30' attached to a second side 1' of the wing.

The design of the attachment is such that it could be made to have adjustable length or size to allow for rigging to different systems.

Whilst FIG. 2 shows the actuator mounted to the main body of the wing and the rotor attached to the wing tip, it is also feasible that the actuator could be mounted, via the compliant attachment, to the wing tip and the rotor attached to the wing body 1.

The compliant attachment is a simple component that can be quickly and easily installed and removed, if necessary, for maintenance etc. The component can have reduced weight and complexity compared to conventional attachment structures.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A rotary actuator mounting system configured to:
    attach a rotary actuator to and between two relatively moveable parts, the rotary actuator including a stator configured to attach to a first of the two relatively moveable parts and a rotor part rotatable relative to the stator part, configured to be attached to a second of the two relatively moveable parts such that operation of the actuator causes one of the first and second relatively movable parts to rotate relative to the other of the first and second relatively movable parts about an axis of the rotary actuator, the mounting system further comprising:
    a compliant attachment component for connecting the stator part to the first relatively moveable part, the compliant attachment component having a first end configured to be attached to the first movable part and the stator part of the actuator, wherein at least one of the first end and the second end is in the form of a ball bearing arranged to be received in a complementary socket on the actuator and/or the first movable part;

wherein one or both the first end and the second end is a ball bearing.

2. The rotary actuator mounting system of claim 1, wherein the rotary actuator comprises one or more earth members and wherein the first end of the attachment component is attached to an earth member.

3. The rotary actuation mounting system of claim 1, wherein the rotary actuator comprises an output rotor attached to the second relatively moveable part.

4. The rotary actuation mounting system of claim 1, wherein the rotary actuator is a rotary geared actuator.

5. The rotary actuator mounting system of claim 1, wherein the compliant attachment component comprises two compliant attachment components, wherein a first compliant attachment component is attached between a first location of the actuator and a first side of the first relatively movable part and a second compliant attachment component is attached between a second location of the actuator and a second side of the first relatively movable structure.

6. The rotary actuator mounting system of claim 5, wherein the actuator comprises a first earth member at the first location, to which the first compliant attachment component is attached, and a second earth member at the second location, to which the second compliant attachment component is attached.

7. An aircraft wing comprising:
   a main wing body part;
   a second wing part movable relative to the main wing body part; and
   a rotary actuator mounting system as claimed in claim 1 arranged to mount the rotary actuator to one of the main wing body part and the second wing part to cause rotation of the second wing part relative to the main wing body part.

8. The aircraft wing as claimed in claim 7, wherein the actuator is mounted to the main wing body part.

9. The aircraft wing as claimed in claim 7, wherein the second wing part is a wing tip.

\* \* \* \* \*